United States Patent
Cho et al.

(10) Patent No.: US 9,954,221 B2
(45) Date of Patent: Apr. 24, 2018

(54) CATHODE ACTIVE MATERIAL FOR LITHIUM RECHARGEABLE BATTERY, METHOD OF MANUFACTURING THE SAME, AND LITHIUM RECHARGEABLE BATTERY INCLUDING THE SAME

(71) Applicant: UNIST Academy-Industry Research Corporation, Ulsan (KR)

(72) Inventors: Jaephil Cho, Ulsan (KR); Pilgun Oh, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 895 days.

(21) Appl. No.: 14/250,790

(22) Filed: Apr. 11, 2014

(65) Prior Publication Data

US 2015/0155553 A1    Jun. 4, 2015

(30) Foreign Application Priority Data

Nov. 29, 2013    (KR) .................. 10-2013-0147677

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0419* (2013.01); *H01M 4/0471* (2013.01);
(Continued)

(58) Field of Classification Search
CPC ...... H01M 4/366; H01M 4/525; H01M 4/505; H01M 4/0419; H01M 4/0471; H01M 10/052; H01M 2004/028
See application file for complete search history.

(56) References Cited

U.S. PATENT DOCUMENTS

| | | | | |
|---|---|---|---|---|
| 2008/0241693 | A1* | 10/2008 | Fukuchi | C01G 45/006 429/231.1 |
| 2009/0235721 | A1* | 9/2009 | Robinson | B82Y 20/00 73/31.05 |
| 2012/0088151 | A1* | 4/2012 | Yamazaki | B82Y 30/00 429/211 |

FOREIGN PATENT DOCUMENTS

| | | | |
|---|---|---|---|
| CN | 102169979 | * | 8/2011 |
| KR | 10-2012-0095803 | | 8/2012 |

OTHER PUBLICATIONS

Office Action, Korea Intellectual Property Office, dated Jan. 26, 2016, Korean Patent Application No. 10-2013-0147677.

* cited by examiner

*Primary Examiner* — Ula C Ruddock
*Assistant Examiner* — Matthew W Van Oudenaren
(74) *Attorney, Agent, or Firm* — Lex IP Meister, PLLC

(57) ABSTRACT

The present invention relates to a cathode active material for a lithium rechargeable battery, a method of manufacturing the same, and a lithium rechargeable battery including the same, and provides the cathode active material for the lithium rechargeable battery, including a core including a compound represented by the following Chemical Formula 1, and a coating layer positioned on the core and including a compound represented by the following Chemical Formula 2.

$$_xLi_2MnO_3\text{-}_{(1-x)}LiM^1O_2 \quad \text{[Chemical Formula 1]}$$

In Chemical Formula 1, 0<x<1 and $M^1$ is a transition metal.

$$_yMnO_z\text{-}_{(1-y)}LiM^2O_2 \quad \text{[Chemical Formula 2]}$$

In Chemical Formula 2, 0<y<1, 1≤z≤4, and $M^2$ is a transition metal.

6 Claims, 9 Drawing Sheets

(51) Int. Cl.
*H01M 4/48* (2010.01)
*H01M 4/505* (2010.01)
*H01M 4/525* (2010.01)
*H01M 10/052* (2010.01)
*H01M 4/02* (2006.01)

(52) U.S. Cl.
CPC ........... *H01M 4/505* (2013.01); *H01M 4/525* (2013.01); *H01M 10/052* (2013.01); *H01M 2004/028* (2013.01)

CATHODE ACTIVE MATERIAL FOR LITHIUM RECHARGEABLE BATTERY, METHOD OF MANUFACTURING THE SAME, AND LITHIUM RECHARGEABLE BATTERY INCLUDING THE SAME

CROSS-REFERENCE TO RELATED APPLICATION

This application claims priority to and the benefit of Korean Patent Application No. 10-2013-0147677 filed in the Korean Intellectual Property Office on Nov. 29, 2013, the entire contents of which are incorporated herein by reference.

BACKGROUND OF THE INVENTION (a) Field of the Invention

The present invention relates to a cathode active material for a lithium rechargeable battery, a method of manufacturing the same, and a lithium rechargeable battery including the same.

(b) Description of the Related Art

With respect to the recent trend of a reduction in size and weight of portable electronic devices, demand for an increase in performance and capacity of a battery used as a power source for the devices has increased.

The battery generates electric power by using a material which can electrochemically react with a cathode and an anode. A representative example of the batteries includes a lithium rechargeable battery generating electrical energy by a change in chemical potential when lithium ions are subjected to intercalation/deintercalation in the cathode and the anode.

The lithium rechargeable battery is manufactured by using a material where reversible intercalation/deintercalation of the lithium ions is feasible as cathode and anode active materials, and charging an organic electrolyte solution or a polymer electrolyte solution between the cathode and the anode.

A lithium complex metal compound is used as the cathode active material of the lithium rechargeable battery, and complex metal oxides such as $LiCoO_2$, $LiMn_2O_4$, $LiNiO_2$, $LiNi_{1-x}Co_xO_2$ (0<x<1), and $LiMnO_2$ have been researched as an example thereof.

Among the cathode active materials, a Mn-based cathode active material such as $LiMn_2O_4$ and $LiMnO_2$ can be easily synthesized and is relatively inexpensive, and has the highest thermal stability during over-charging as compared to other active materials, and a low degree of pollution to the environment, and thus is attractive, but has a drawback in that capacity thereof is small.

Further, $LiNiO_2$ has a battery characteristic of the highest discharging capacity among the aforementioned cathode active materials, but has a drawback in that it is difficult to synthesize $LiNiO_2$. Further, a high oxidation state of nickel becomes a cause of deterioration of the life-span of both a battery and an electrode, and there are problems in that self-discharging is severe and reversibility is poor. Moreover, since stability is not completely secured, there is difficulty in commercialization.

Currently, $LiCoO_2$ is generalized as an active material having a particle diameter of about 10 μm, but does not ensure sufficient energy density.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cathode active material having an improved characteristic. To be more specific, the present invention relates to a cathode active material for a lithium rechargeable battery having high initial coulombic efficiency and excellent life-span and output characteristics, a method of manufacturing the same, and a lithium rechargeable battery manufactured using the same.

An exemplary embodiment of the present invention provides a cathode active material for a lithium rechargeable battery, including: a core including a compound represented by the following Chemical Formula 1; and a coating layer positioned on the core and including a compound represented by the following Chemical Formula 2.

  [Chemical Formula 1]

In Chemical Formula 1, 0<x<1 and $M^1$ is a transition metal.

  [Chemical Formula 2]

In Chemical Formula 2, 0<y<1, 1≤z≤4, and $M^2$ is a transition metal.

The cathode active material may further include a reduced graphene oxide layer positioned on the coating layer.

A thickness of the reduced graphene oxide layer may be 1 to 5 nm.

A Li/M molar ratio of the entire cathode active material including the core and the coating layer may be 1.05 to 1.6.

A thickness of the coating layer may be 1 to 13 nm.

$M^1$ of Chemical Formula 1 and $M^2$ of Chemical Formula 2 may include Ni, Co, or Mn.

Another exemplary embodiment of the present invention provides a method of manufacturing a cathode active material for a lithium rechargeable battery, including: preparing a lithium complex oxide and a basic solution; activating a surface of the lithium complex oxide by adding the lithium complex oxide to the basic solution, and performing mixing and heating; and firing the lithium complex oxide with the activated surface.

The activating of the surface of the lithium complex oxide by adding the lithium complex oxide to the basic solution and performing mixing and heating may include: heating the basic solution to 30 to 120° C.; and performing agitation after adding the lithium complex oxide to the heated basic solution.

The performing of agitation after adding the lithium complex oxide to the heated basic solution may take place for 1 to 240 hours.

The method may further include, before the firing of the lithium complex oxide with the activated surface, drying the lithium complex oxide with the activated surface.

The drying of the lithium complex oxide with the activated surface may be performed at 80 to 160° C.

The firing of the lithium complex oxide with the activated surface may be performed at 100 to 900° C.

The firing of the lithium complex oxide with the activated surface may be performed at 110 to 150° C.

The basic solution may be a solution having hydrogen ions that are exchanged with lithium ions.

The basic solution may be a hydrazine solution, an ammonia solution, or a combination thereof.

In the preparing of the lithium complex oxide and the basic solution, the lithium complex oxide may be a lithium complex oxide in which a graphene oxide layer is formed.

The lithium complex oxide in which the graphene oxide layer is formed may be prepared by: preparing a solution in which a graphene oxide is dispersed; performing agitation after adding the lithium complex oxide to the solution; and obtaining the lithium complex oxide in which the reduced graphene oxide layer is formed by using the solution where the graphene oxide and the lithium complex oxide are agitated by a spray drying method.

The cathode active material formed by the manufacturing method may include: a core including a compound represented by the following Chemical Formula 1; a coating layer positioned on the core and including a compound represented by the following Chemical Formula 2; and the reduced graphene oxide layer positioned on the coating layer.

$_xLi_2MnO_3$—$_{(1-x)}LiM^1O_2$ [Chemical Formula 1]

In Chemical Formula 1, 0<x<1 and $M^1$ is a transition metal.

$_yMnO_z$—$_{(1-y)}LiM^2O_2$ [Chemical Formula 2]

In Chemical Formula 2, 0<y<1, 1≤z≤4, and $M^2$ is a transition metal.

The cathode active material formed by the manufacturing method may include: a core including a compound represented by the following Chemical Formula 1; and a coating layer positioned on the core and including a compound represented by the following Chemical Formula 2.

$_xLi_2MnO_3$—$_{(1-x)}LiM^1O_2$ [Chemical Formula 1]

In Chemical Formula 1, 0<x<1 and $M^1$ is a transition metal.

$_yMnO_z$—$_{(1-y)}LiM^2O_2$ [Chemical Formula 2]

In Chemical Formula 2, 0<y<1, 1≤z≤4, and $M^2$ is a transition metal.

Yet another exemplary embodiment of the present invention provides a lithium rechargeable battery including: a cathode including the cathode active material for the lithium rechargeable battery according to the aforementioned exemplary embodiments of the present invention; an anode including an anode active material; and an electrolyte.

According to the exemplary embodiments of the present invention, it is possible to provide a cathode active material for a lithium rechargeable battery having high initial coulombic efficiency and excellent life-span and output characteristics, a method of manufacturing the same, and a lithium rechargeable battery manufactured using the same.

DETAILED DESCRIPTION OF THE EMBODIMENTS

Figure 1:
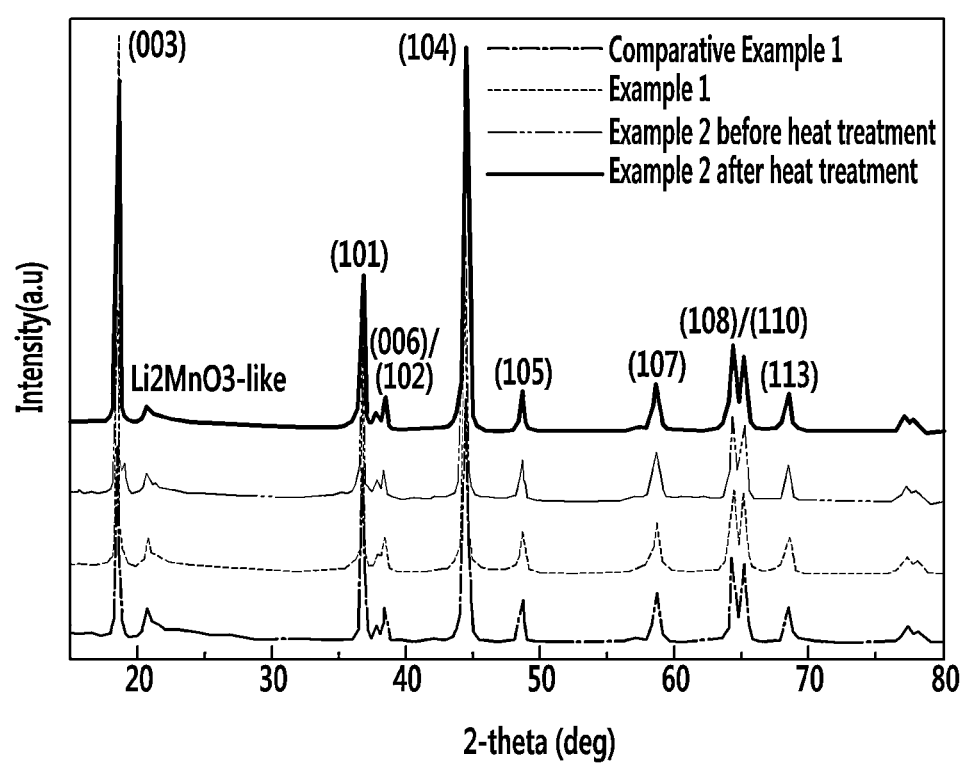
FIG. 1 shows XRD analysis results of Examples 1 and 2 and Comparative Example 1.

Exemplary embodiments of the present invention will hereinafter be described in detail. However, the exemplary embodiments are illustrative only, and are not to be construed to limit the present invention, and the present invention is just defined by the scope of the claims as will be described below.

An exemplary embodiment of the present invention may provide a cathode active material for a lithium rechargeable battery having high initial coulombic efficiency and excellent life-span and output characteristics, a method of manufacturing the same, and a lithium rechargeable battery manufactured using the same.

In the cathode active material according to the exemplary embodiment of the present invention, a structurally and electrochemically stable coating layer (or surface layer) may be formed on a surface of the active material by chemically activating a $Li_2MnO_3$ phase of the surface of the active material by using an aqueous solution (e.g., a basic solution) including hydrogen ions, and then performing heat treatment.

Further, optionally, the cathode active material for the lithium rechargeable battery according to the exemplary embodiment of the present invention may further include a reduced graphene oxide layer having excellent electrical conductivity as the coating layer.

To be more specific, the exemplary embodiment of the present invention provides the cathode active material for the lithium rechargeable battery including a core including a compound represented by the following Chemical Formula 1, and a coating layer positioned on the core and including a compound represented by the following Chemical Formula 2.

$_xLi_2MnO_3$—$_{(1-x)}LiM^1O_2$ [Chemical Formula 1]

In Chemical Formula 1, 0<x<1 and $M^1$ is a transition metal.

$_yMnO_z$—$_{(1-y)}LiM^2O_2$ [Chemical Formula 2]

In Chemical Formula 2, 0<y<1, 1≤z≤4, and $M^2$ is a transition metal.

A structure of the compound represented by Chemical Formula 2 is a structure in which lithium which is generated by a manufacturing method using a basic solution as will be described below is eliminated. This structure is structurally and electrochemically stable, and may improve the life-span and output characteristics of the battery. A thickness of the coating layer may be 1 to 13 nm, and more specifically 1 to 10 nm. The life-span and output characteristics may be slightly changed according to a thickness range, and an agitation time as will be described below may be controlled according to a target thickness.

Further, the cathode active material may further include a reduced graphene oxide layer positioned on the coating layer. A thickness of the reduced graphene oxide layer may be 1 to 5 nm. The thickness range can be optionally adjusted according to the characteristic of the active material, but is not limited thereto.

A Li/M molar ratio of the entire cathode active material including the core and the coating layer may be 1.05 to 1.6, and more specifically 1.1 to 1.35. This ratio is a ratio of elimination of Li as compared to an initially added raw material, and may be changed according to the thickness of the coating layer.

$M^1$ of Chemical Formula 1 and $M^2$ of Chemical Formula 2 may be Ni, Co, or Mn. All transition metals already known in the art can be used, so $M^1$ and $M^2$ are not limited thereto.

Another exemplary embodiment of the present invention provides a method of manufacturing a cathode active material for a lithium rechargeable battery, including: preparing a lithium complex oxide and a basic solution; activating a surface of the lithium complex oxide by adding the lithium complex oxide to the basic solution, and performing mixing and heating; and firing the lithium complex oxide with the activated surface.

The activating of the surface of the lithium complex oxide by adding the lithium complex oxide to the basic solution and performing mixing and heating may include: heating the basic solution to 30 to 120° C.; and performing agitation after adding the lithium complex oxide to the heated basic solution.

The performing of agitation after adding the lithium complex oxide to the heated basic solution may take place for 1 to 240 hours, and more specifically 1 to 20 hours. The thickness of the aforementioned coating layer may be controlled according to the agitation time.

The method may further include, before the firing of the lithium complex oxide with the activated surface, drying the lithium complex oxide with the activated surface.

The drying of the lithium complex oxide with the activated surface may be performed at 80 to 160° C. However, the drying is not limited thereto.

The firing of the lithium complex oxide with the activated surface may be performed at 100 to 900° C., more specifically 110 to 220° C., and more specifically 110 to 150° C. However, the firing is not limited thereto.

The basic solution may be a solution having hydrogen ions exchanged with lithium ions.

To be more specific, the basic solution may be a hydrazine solution, an ammonia solution, or a combination thereof. However, the basic solution is not limited thereto.

In the preparing of the lithium complex oxide and the basic solution, the lithium complex oxide may be a lithium complex oxide in which a graphene oxide layer is formed.

The lithium complex oxide in which a graphene oxide layer is formed may be prepared by: preparing a solution in which a graphene oxide is dispersed; performing agitation after adding the lithium complex oxide to the solution; and obtaining the lithium complex oxide in which the graphene oxide layer is formed by using the solution where the graphene oxide and the lithium complex oxide are agitated by a spray drying method. Since the spray drying method is well known in the art, a detailed description thereof will be omitted.

The cathode active material prepared by the manufacturing method may include the core including the compound represented by the following Chemical Formula 1, the coating layer positioned on the core and including the compound represented by the following Chemical Formula 2, and the reduced graphene oxide layer positioned on the coating layer.

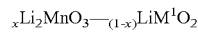  [Chemical Formula 1]

In Chemical Formula 1, 0<x<1 and $M^1$ is a transition metal.

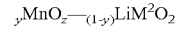  [Chemical Formula 2]

In Chemical Formula 2, 0<y<1, 1≤z≤4, and $M^2$ is a transition metal.

The cathode active material prepared by the manufacturing method may include the core including the compound represented by the following Chemical Formula 1, and the coating layer positioned on the core and including the compound represented by the following Chemical Formula 2.

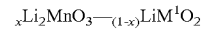  [Chemical Formula 1]

In Chemical Formula 1, 0<x<1 and $M^1$ is a transition metal.

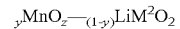  [Chemical Formula 2]

In Chemical Formula 2, 0<y<1, 1≤z≤4, and $M^2$ is a transition metal.

Since a detailed description of the structure of the cathode active material is the same as that of the aforementioned exemplary embodiment of the present invention, the description will be omitted.

The cathode active material according to the exemplary embodiment of the present invention may be effectively used in a cathode of the lithium rechargeable battery. The lithium rechargeable battery includes an anode including an anode active material and an electrolyte together with the cathode.

The cathode is manufactured by mixing the cathode active material according to the exemplary embodiment of the present invention, a conductive material, a binder, and a solvent to manufacture a cathode active material composition, and then directly applying and drying the cathode active material composition on an aluminum current collector. Alternatively, the cathode can be manufactured by casting the cathode active material composition on a separate support, and then laminating a film obtained by stripping the cathode active material from the support on an aluminum current collector.

In this case, carbon black, graphite, or a metal powder is used as the conductive material, and a vinylidene fluoride/hexafluoropropylene copolymer, polyvinylidene fluoride, polyacrylonitrile, polymethyl methacrylate, polytetrafluoroethylene, and a mixture thereof are feasible as the binder. Further, N-methylpyrrolidone, acetone, tetrahydrofuran, decane, and the like are used as the solvent. In this case, the cathode active material, the conductive material, the binder, and the solvent are used in a content at a level typically used in the lithium rechargeable battery.

Like the cathode, the anode is manufactured by mixing an cathode active material, a binder, and a solvent to manufacture an anode active material composition, directly applying the anode active material composition on a copper current collector or casting the anode active material composition on a separate support, and laminating an anode active material film stripped from the support on the copper current collector. In this case, if necessary, the anode active material composition may further contain a conductive material.

A material where intercalation/deintercalation of lithium is feasible is used as the anode active material, and for example, a lithium metal or a lithium alloy, cokes, artificial graphite, natural graphite, organic polymer compound combustion bodies, carbon fibers, and the like are used. Further, the conductive material, the binder, and the solvent are used identically to those of the aforementioned cathode.

All separators typically used in the lithium rechargeable battery can be used, and for example, polyethylene, polypropylene, polyvinylidene fluoride, or a multilayer of two or more layers thereof may be used, and needless to say, a mixed multilayer such as a polyethylene/polypropylene two-layered separator, a polyethylene/polypropylene/polyethylene three-layered separator, and a polypropylene/polyethylene/polypropylene three-layered separator may be used.

A non-aqueous electrolyte, a known solid electrolyte, or the like can be used as the electrolyte charged in the lithium rechargeable battery, and an electrolyte where a lithium salt is dissolved is used.

The solvent of the non-aqueous electrolyte is not particularly limited, but cyclic carbonates such as ethylene carbonate, propylene carbonate, butylene carbonate, and vinylene carbonate; chained carbonates such as dimethyl carbonate, methylethyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; amides such as dimethylformamide; and the like may be used. The aforementioned examples may be used either alone or in a combination of a plurality of examples. Particularly, a mixed solvent of a cyclic carbonate and a chained carbonate may be preferably used.

Further, a gel-shaped polymer electrolyte where an electrolyte solution is impregnated in a polymer electrolyte such as polyethylene oxide and polyacrylonitrile, or an inorganic solid electrolyte such as LiI and $Li_3N$, is feasible as the electrolyte.

In this case, one kind selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, LiC, and LiI is feasible as the lithium salt.

Hereinafter, examples and comparative examples of the present invention will be described. However, the following examples are only the preferred examples of the present invention, and the present invention is not limited thereto.

EXAMPLES

Example 1: Manufacturing of Cathode Active Material

After 40 μg of hydrazine monohydrate was added to 10 mg of deionized water, the aqueous solution was heated to 90° C., and the temperature was maintained.

Subsequently, after 2 g of $0.4Li_2MnO_3\text{-}0.6LiNi_{1/3}Mn_{1/3}Co_{1/3}O_2$ was added and mixed, agitation was performed for 3 hours.

Drying was then performed at a temperature of 120° C. for 12 hours, and heat treatment was performed at a temperature of 200° C. for 3 hours.

Thereby, the cathode active material for the lithium rechargeable battery was manufactured. The composition of the manufactured cathode active material for the lithium rechargeable battery was $0.33Li_2MnO_3\text{-}0.6LiNi_{1/3}Mn_{1/3}Co_{1/3}O_2$.

Example 2: Manufacturing of Cathode Active Material

After 40 μg of hydrazine monohydrate was added to 10 mg of deionized water, the aqueous solution was heated to 90° C., and the temperature was maintained.

Subsequently, after 2 g of $0.4Li_2MnO_3\text{-}0.6LiNi_{1/3}Mn_{1/3}Co_{1/3}O_2$ was added and mixed, agitation was performed for 10 hours.

Drying was then performed at a temperature of 120° C. for 12 hours, and heat treatment was performed at a temperature of 200° C. for 3 hours.

Thereby, the cathode active material for the lithium rechargeable battery was manufactured. The composition of the manufactured cathode active material for the lithium rechargeable battery was $0.18Li_2MnO_3\text{-}0.6LiNi_{1/3}Mn_{1/3}Co_{1/3}O_2$.

Example 3: Manufacturing of Cathode Active Material 200 ml of a 4 mg/ml graphene oxide solution was added to 10 mg of deionized water, and then agitated.

Subsequently, after 16 g of $0.4Li_2MnO_3\text{-}0.6LiNi_{1/3}Mn_{1/3}Co_{1/3}O_2$ was added and mixed, agitation was performed for 1 hour.

Spraying was then performed into the cylinder at 190° C. by using a spray drier.

Subsequently, drying was performed at a temperature of 120° C. for 12 hours.

Thereby, the cathode active material for the lithium rechargeable battery was manufactured. The composition of the manufactured cathode active material for the lithium rechargeable battery was $0.4Li_2MnO_3\text{-}0.6LiNi_{1/3}Mn_{1/3}Co_{1/3}O_2$, the surface of which was coated with graphene oxide.

Example 4: Manufacturing of Cathode Active Material for Lithium Rechargeable Battery After 40 μg of hydrazine monohydrate was added to 10 mg of deionized water, the aqueous solution was heated to 90° C., and the temperature was maintained.

Subsequently, after 2 g of $0.4Li_2MnO_3\text{-}0.6LiNi_{1/3}Mn_{1/3}Co_{1/3}O_2$ that was the resulting material of Example 3, the surface of which was coated with graphene oxide, was added and mixed, agitation was performed for 3 hours.

Drying was then performed at a temperature of 120° C. for 12 hours, and heat treatment was performed at a temperature of 200° C. for 3 hours.

Thereby, the cathode active material for the lithium rechargeable battery was manufactured. The composition of the manufactured cathode active material for the lithium rechargeable battery was $0.33Li_2MnO_3\text{-}0.6LiNi_{1/3}Mn_{1/3}Co_{1/3}O_2$, the surface of which was coated with reduced graphene oxide.

Example 5: Manufacturing of Lithium Rechargeable Battery

The cathode active material for the lithium rechargeable battery manufactured in Example 1, Super-P as a conductive material, and polyvinylidene fluoride (PVdF) as a binder were mixed at the weight ratio of 8:1:1 to manufacture a slurry. The slurry was uniformly applied on an aluminum foil having a thickness of 15 μm, and vacuum-dried at a temperature of 120° C. to manufacture a cathode.

A half cell was manufactured by using the manufactured cathode and a lithium foil as the counter electrode, and using the liquid electrolyte solution in which $LiPF_6$ was dissolved in a concentration of 1.0 M in the solvent where porous polyethylene carbonate, ethylmethyl carbonate, and dimethyl carbonate were mixed at a volume ratio of 3:4:3, according to the typically known manufacturing process.

Example 6: Manufacturing of Lithium Rechargeable Battery

The same procedure as Example 5 was performed to manufacture a coin half cell, except that the cathode active material for the lithium rechargeable battery manufactured in Example 2 was used.

Example 7: Manufacturing of Lithium Rechargeable Battery

The same procedure as Example 5 was performed to manufacture a coin half cell, except that the cathode active material for the lithium rechargeable battery manufactured in Example 4 was used.

Comparative Example 1: Cathode Active Material for Lithium Rechargeable Battery

The compound represented by $0.4Li_2MnO_3$-$0.6LiNi_{1/3}Mn_{1/3}Co_{1/3}O_2$ was used as the cathode active material for the lithium rechargeable battery.

Comparative Example 2: Manufacturing of Lithium Rechargeable Battery

The same procedure as Example 5 was performed to manufacture a coin half cell, except that the cathode active material for the lithium rechargeable battery of Comparative Example 1 was used.

EXPERIMENTAL EXAMPLE

Experimental Example 1: IPC Analysis

The following Table 1 shows component analysis results of Example 1 and Comparative Example 1.

TABLE 1

|  | Li | Mn | Co | Ni | Li/M ratio (molar ratio) |
|---|---|---|---|---|---|
| Comparative Example 1 | 7.01 | 3.01 | 0.98 | 1.00 | 1.41 |
| Example 1 | 6.46 | 2.99 | 0.98 | 1.00 | 1.3 |

As a result of the analysis, it can be confirmed that the Li/M ratio is changed by hydrazine treatment of Example 1. This is judged to be caused by chemical elimination of Li.

Experimental Example 2: XRD Analysis

FIG. 1 shows XRD analysis results of Examples 1 and 2 and Comparative Example 1.

It can be seen that an XRD peak is formed around 19° according to an increase in hydrazine treatment time. Accordingly, it can be seen that $Li^+/H^+$ ions are exchanged.

Experimental Example 3: SEM Analysis

Figure 2:
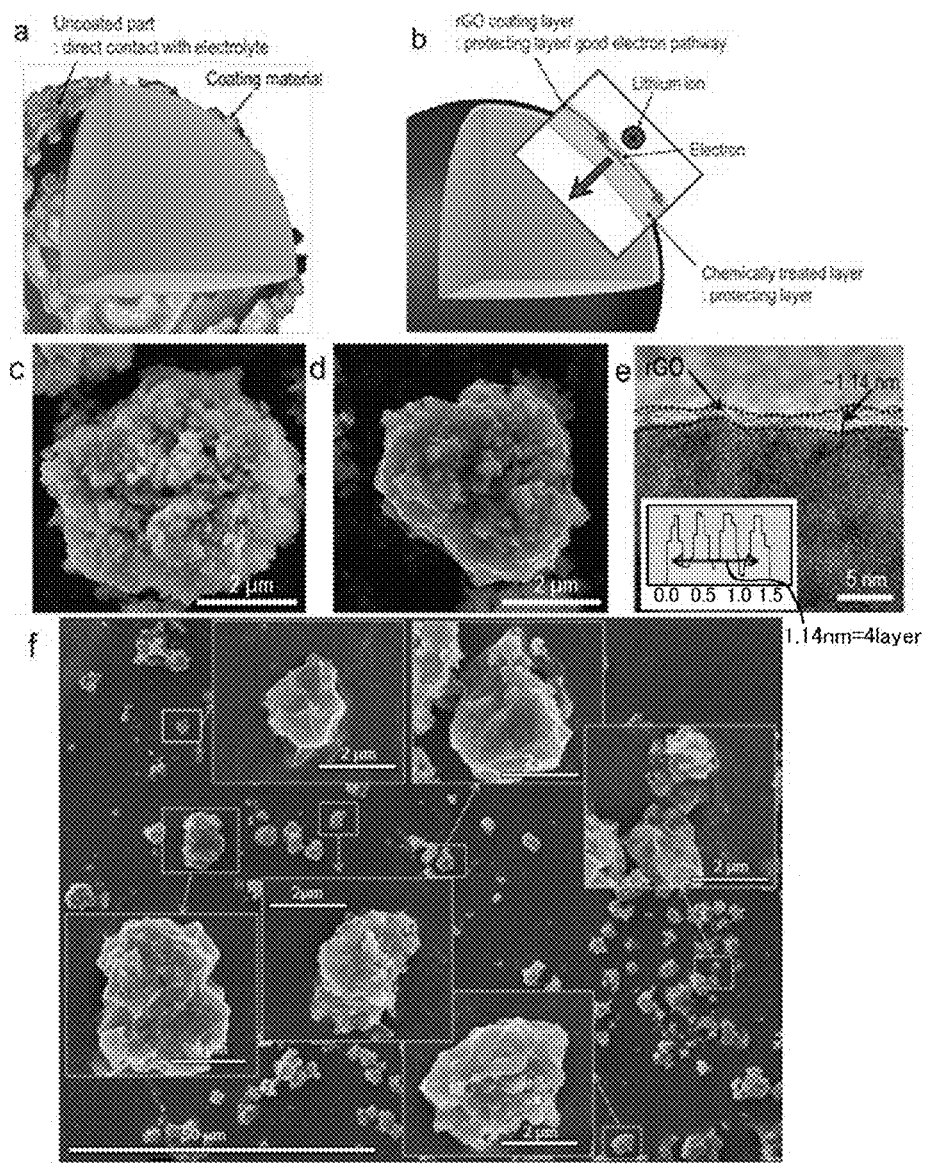
FIG. 2 shows SEM photographs of active materials according to the examples and the comparative examples.

FIG. 2 shows SEM photographs of the active materials according to the examples and the comparative examples. After the cathode active materials for the lithium rechargeable batteries of Example 1 and Comparative Example 1 were sampled on a carbon tape, platinum (Pt) plasma coating was performed to take SEM photographs. To be more specific, a description of each picture in FIG. 2 is as follows.

a. Conceptual diagram of the cathode active material, the surface of which is coated by a general sol-gel method b. Conceptual diagram of the cathode active material according to Example 4 c. $0.4Li_2MnO_3$-$0.6LiNi_{1/3}Mn_{1/3}Co_{1/3}O_2$ bare material used d. $0.4Li_2MnO_3$-$0.6LiNi_{1/3}Mn_{1/3}Co_{1/3}O_2$, the surface of which is coated with graphene oxide formed by Example 3 e. Active material according to Example 4 f. Active material according to Example 3

It can be confirmed that surface treatment and graphene oxide treatment according to the examples of the present invention are uniformly performed well.

Experimental Example 4: TEM Analysis

Figure 3:
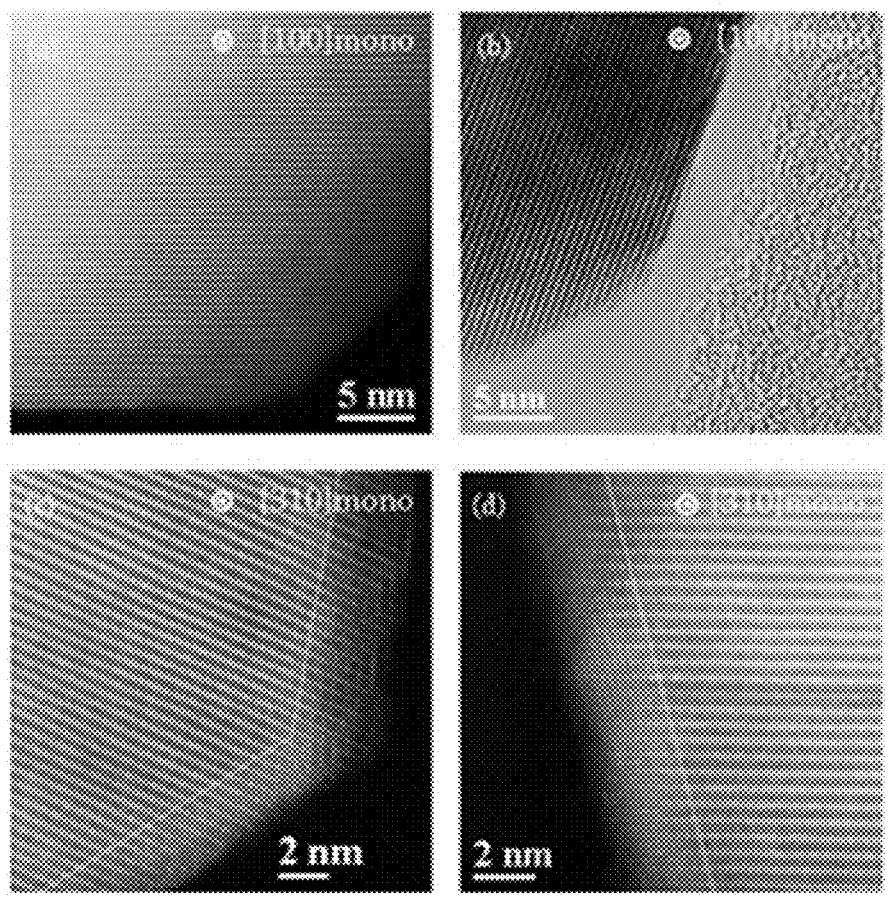
FIG. 3 shows TEM photographs of the active material according to Example 1.

FIG. 3 shows TEM photographs of the active material according to Example 1. It can be confirmed that a 2 to 3 nm coating layer is formed on the surface.

Figure 4:
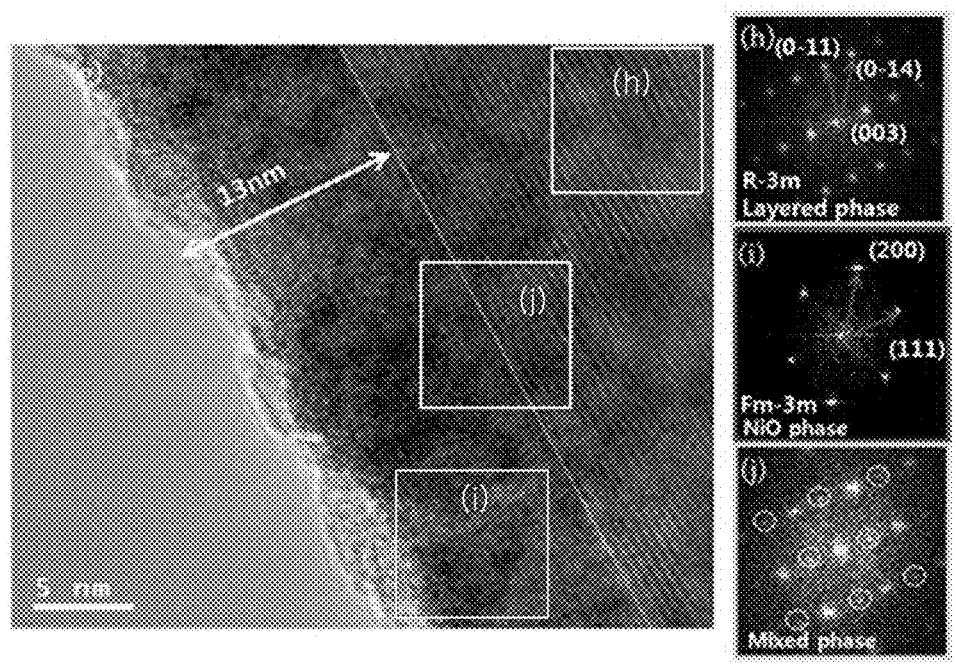
FIG. 4 shows TEM photographs of the active material according to Example 2.

FIG. 4 shows TEM photographs of the active material according to Example 2. It can be confirmed that the coating layer of around 13 nm is formed on the surface. That is, it can be seen that the thickness of the coating layer can be adjusted according to the treatment time.

Experimental Example 5: Battery Characteristic Data

Figure 5:
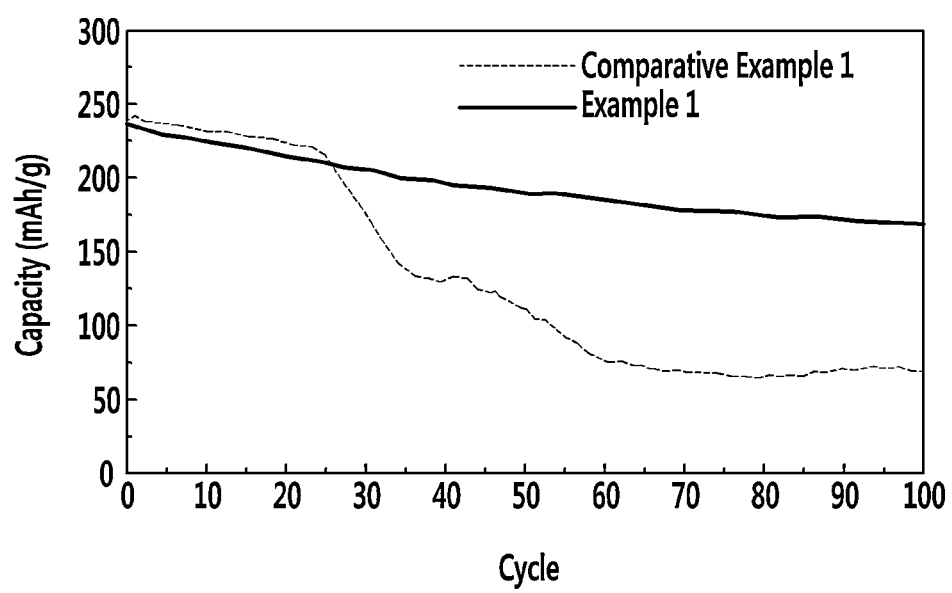
FIG. 5 is a graph illustrating life-span characteristics of batteries according to Example 5 and Comparative Example 2.

FIG. 5 is a graph illustrating life-span characteristics of the batteries according to Example 5 and Comparative Example 2. In FIG. 5, the number of the used active material was used for identification. More specifically, the life-span characteristic was measured at 2.0 to 4.6 V after the first cycle at room temperature/2.0 to 4.7 V (1C-rate).

It can be seen that the life-span characteristic of the coin-cell using the active material according to Example 1 is better.

Figure 6:
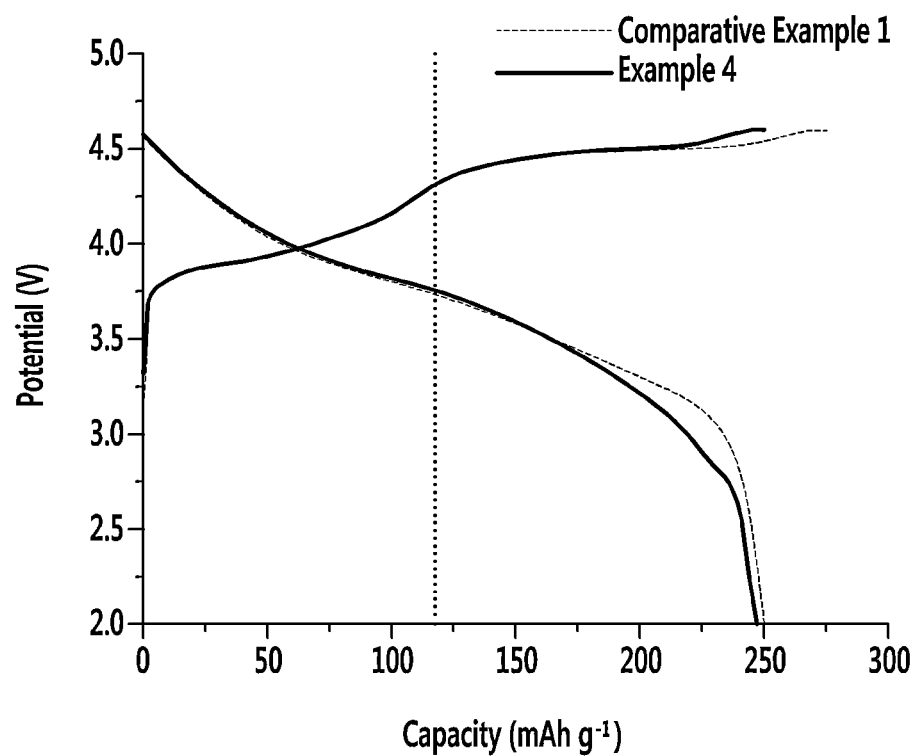
FIG. 6 is a graph illustrating initial efficiency characteristics of batteries according to Example 7 and Comparative Example 2.

FIG. 6 is a graph illustrating initial efficiency characteristics of the batteries according to Example 7 and Comparative Example 2.

It can be seen that the coin-cell using the active material according to Example 4 has high initial efficiency.

Figure 7:
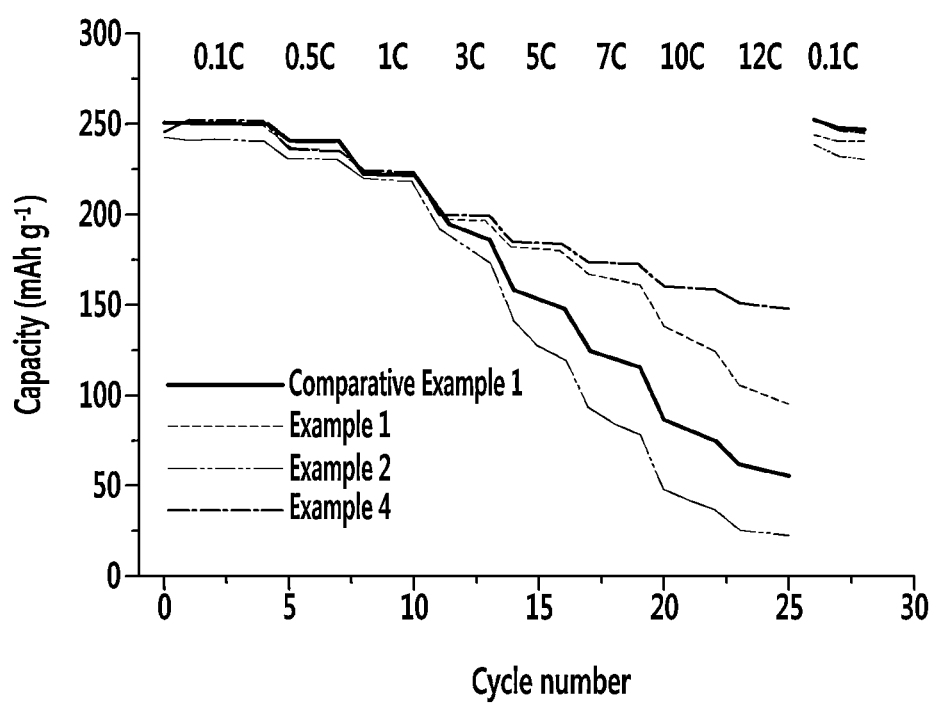
FIG. 7 is a graph illustrating output characteristics of batteries according to Examples 5, 6, and 7 and Comparative Example 2.

FIG. 7 is a graph illustrating output characteristics of the batteries according to Examples 5, 6, and 7 and Comparative Example 2.

It can be seen that the coin-cells using the active materials of Examples 1 and 4 have the better output characteristic as compared to the coin-cell using Comparative Example 1, but in the case of Example 2, the output characteristic is inferior to that of Comparative Example 1. That is, it can be seen that the output characteristic of the battery is partially affected by the thickness of the coating layer according to the hydrazine treatment time.

Figure 8:
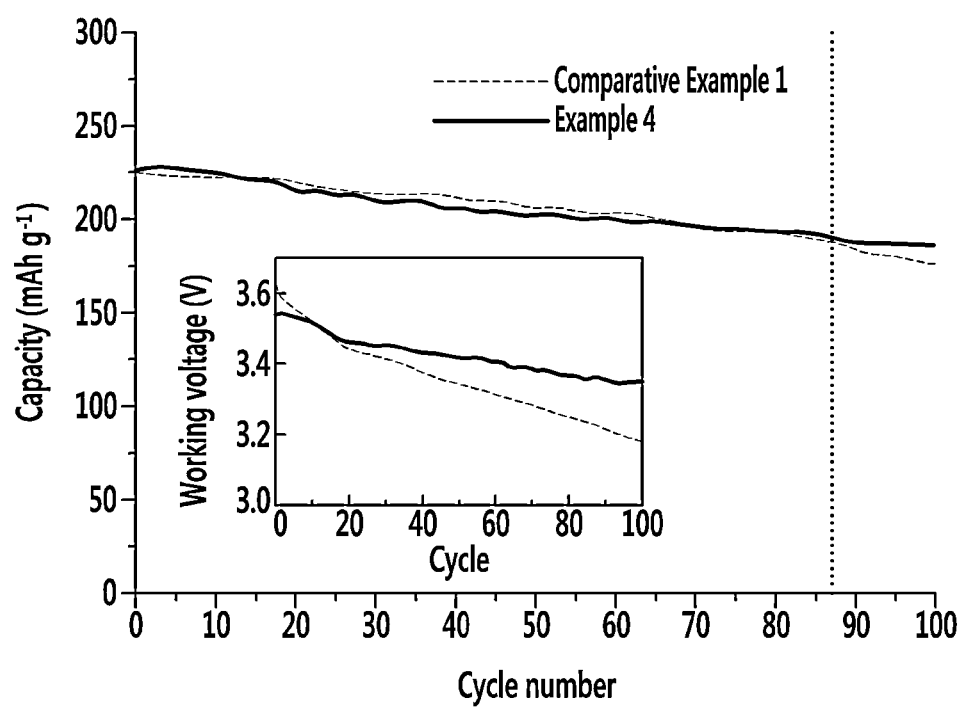
FIG. 8 is a graph illustrating life-span and operation voltage characteristics of batteries according to Example 7 and Comparative Example 2.

FIG. 8 is a graph illustrating the life-span and operation voltage characteristics of the batteries according to Example 7 and Comparative Example 2.

It can be seen that even though Example 7 and Comparative Example 2 have the similar life-span characteristics, in the case of Example 7, an operation voltage reduction is small.

Figure 9:
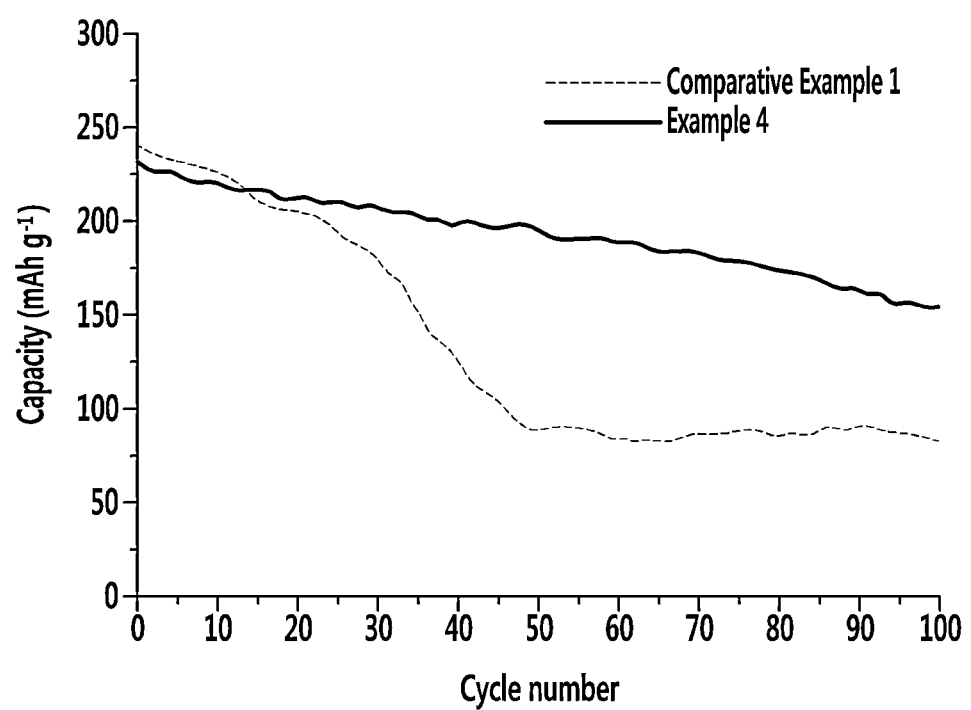
FIG. 9 is a graph illustrating the life-span characteristics according to Example 7 and Comparative Example 2 after initial charging/discharging at 2.0 to 4.8 V.

FIG. 9 is a graph illustrating the life-span characteristics according to Example 7 and Comparative Example 2 after initial charging/discharging at 2.0 to 4.8 V.

It can be seen that the coin-cell according to Example 7 has the improved life-span characteristic as compared to the coin-cell according to Comparative Example 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting in any way.

What is claimed is:

1. A cathode active material for a lithium rechargeable battery, comprising:
   a core including a compound represented by the following Chemical Formula 1; and
   a coating layer positioned on the core and including a compound represented by the following Chemical Formula 2:

$$_xLi_2MnO_3\text{—}_{(1-x)}LiM^1O_2 \quad \text{[Chemical Formula 1]}$$

wherein, in Chemical Formula 1, 0<x<1 and $M^1$ is a transition metal;

$$_yMnO_z\text{—}_{(1-y)}LiM^2O_2 \quad \text{[Chemical Formula 2]}$$

wherein, in Chemical Formula 2, 0<y<1, 1≤z≤4, and $M^2$ is a transition metal,
   wherein a thickness of the coating layer is 1 to 13 nm.

2. The cathode active material for a lithium rechargeable battery of claim 1, further comprising
   a reduced graphene oxide layer positioned on the coating layer.

3. The cathode active material for a lithium rechargeable battery of claim 2, wherein
   a thickness of the reduced graphene oxide layer is 1 to 5 nm.

4. The cathode active material for a lithium rechargeable battery of claim 1, wherein
   a Li/M molar ratio of the entire cathode active material including the core and the coating layer is 1.05 to 1.6.

5. The cathode active material for a lithium rechargeable battery of claim 1, wherein
   $M^1$ of Chemical Formula 1 and $M^2$ of Chemical Formula 2 include Ni, Co, or Mn.

6. A lithium rechargeable battery comprising:
   a cathode including the cathode active material for the lithium rechargeable battery according to claim 1;
   an anode including an anode active material; and
   an electrolyte.

* * * * *